(12) United States Patent
Wang et al.

(10) Patent No.: US 12,105,185 B2
(45) Date of Patent: Oct. 1, 2024

(54) SYSTEM AND METHOD FOR RADAR OBJECT RECOGNITION WITH CROSS-FRAME TEMPORAL RELATIONALITY

(71) Applicant: Mitsubishi Electric Research Laboratories, Inc., Cambridge, MA (US)

(72) Inventors: Pu Wang, Cambridge, MA (US); Peizhao Li, Cambridge, MA (US); Karl Berntorp, Newton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 382 days.

(21) Appl. No.: 17/656,523

(22) Filed: Mar. 25, 2022

(65) Prior Publication Data

US 2023/0305136 A1    Sep. 28, 2023

(51) Int. Cl.
*G01S 13/72*    (2006.01)
*G06N 3/045*    (2023.01)
*G06T 7/277*    (2017.01)

(52) U.S. Cl.
CPC .............. *G01S 13/72* (2013.01); *G06N 3/045* (2023.01); *G06T 7/277* (2017.01); *G06T 2207/10044* (2013.01); *G06T 2207/20081* (2013.01); *G06T 2207/20084* (2013.01)

(58) Field of Classification Search
CPC ...... G01S 13/72; G01S 13/723; G01S 13/931; G01S 7/417; G06N 3/045; G06T 2207/10044
See application file for complete search history.

(56) References Cited

FOREIGN PATENT DOCUMENTS

CN    114092778 A    *    2/2022

OTHER PUBLICATIONS

Cui et al., Classification of visible and infrared hyperspectral images based on image segmentation and edge-preserving filtering, a College of Computer Science and Engineering, Shandong University of Science and Technology, Qingdao 266590, Chin, Dec. 27, 2016 (Year: 2016).*
Li et al., Exploiting Temporal Relations on Radar Perception for Autonomous Driving, 2022 IEEE/CVF Conference on Computer Vision and Pattern Recognition (CVPR), 2022, pp. 17050-17059, Date of Conference: Jun. 18-24 (Year: 2022).*

* cited by examiner

*Primary Examiner* — Barbara D Reinier
(74) *Attorney, Agent, or Firm* — Gene Vinokur; Hironori Tsukamoto

(57) ABSTRACT

The present disclosure provides a system and a method for detecting and tracking objects. The method includes permuting an order of frames in a sequence of radar image frames to produce multiple permuted sequences with different frames at a dominant position in a corresponding permuted sequence of radar image frames. Each permuted sequence of radar image frames is processed with a first neural network to produce temporally enhanced features for each of the frames in the sequence of radar image frames. Further a feature map is reconstructed from the temporally enhanced features of each of the frames in the sequence of radar image frames to produce a sequence of feature maps. The method further includes processing a list of feature vectors from each feature map with a second neural network to produce temporally enhanced heatmaps.

20 Claims, 9 Drawing Sheets

Require: $\mathcal{T}^{t-1} = \{(\mathbf{c}, \text{id})_j^{t-1}\}_{j=1}^{M}$: tracked objects in the previous frame $t-1$; $\hat{\mathcal{B}}^t = \{(\mathbf{c}, v, \mathbf{d})_j^t\}_{j=1}^{N}$: heatmap predictions of object centers $\mathbf{c}$, confidence $v$, and tracking offsets $\mathbf{d}$. $\hat{\mathcal{B}}^t$ are sorted in a descending order according to $v$. Distance threshold $k$. Birth threshold $b$.

1: $S \leftarrow \emptyset, \mathcal{T}^t \leftarrow \emptyset$
2: $W \leftarrow \text{Cost}(\hat{\mathcal{B}}^t, \mathcal{T}^{t-1})$  ▷ $W_{i,j} = \|\mathbf{c}_i^t - \mathbf{d}_i, \mathbf{c}_j^{t-1}\|_2$
3: for $i \leftarrow 1, N$ do
4:  $j \leftarrow \arg\min_{j \notin S} W_{i,j}$
5:  if $w_{i,j} \leq k$ then
6:   $\mathcal{T}^t \leftarrow \mathcal{T}^t \cup (\mathbf{c}_i^t, \text{id}_j^{t-1})$  ▷ Propagate matched id
7:   $S \leftarrow S \cup \{j\}$  ▷ Mark candidate $j$ as tracked
8:  else if $v_i \geq b$ then
9:   $\mathcal{T}^t \leftarrow \mathcal{T}^t \cup (\mathbf{c}_i^t, \text{New id})$  ▷ Create a new track
10:  end if
11: end for
12: return $\mathcal{T}^t$

FIG. 5

SYSTEM AND METHOD FOR RADAR OBJECT RECOGNITION WITH CROSS-FRAME TEMPORAL RELATIONALITY

TECHNICAL FIELD

The present disclosure relates generally to radar systems, and more specifically to a system and a method for detecting and tracking moving objects using radar systems.

BACKGROUND

Autonomous driving utilizes sensing technology for robust dynamic object perception, and sequentially uses various perception sensors for reliable and safe vehicle decision-making. Among the various perception sensors, camera and Lidar are the two dominant sensors used for surrounding object recognition. The camera provides semantically rich visual features of traffic scenarios, while the Lidar provides high-resolution point clouds that can capture reflection on objects.

Compared to the camera and the Lidar, radar is advantageous for automotive applications. The radar transmits electromagnetic waves at a millimeter-wavelength to estimate a range, a velocity, and an angle of objects. At such a wavelength, it can penetrate or diffract around tiny particles in rain, fog, snow, and dust and offers long-range perception in such adverse weather conditions. In contrast, laser sent by the Lidar at a much smaller wavelength may bounce off the tiny particles, which leads to a significantly reduced operating range. Compared with the camera, the radar is also resilient to light conditions, e.g., night, sun glare, etc. Besides, the radar offers a cost-effective and reliable option to complement other sensors.

However, traditional automotive radar is not well-suited for high-resolution perception in the autonomous driving. Instead, the automotive radar generates a range-Doppler (i.e., distance-radial velocity) spectrum and uses it for safety features such as emergency brake and cruise control. A high angular resolution in azimuth and elevation domains becomes indispensable for radar-assisted automotive perception.

In recent automotive radar datasets, an azimuth resolution of sub-1 degree has become available, while an elevation resolution is still lagging. With azimuth resolution of sub-1 degree, semantic features for the objects in a short-range, e.g., corners and shapes, can be observed, while object profiles can still be blurred due to cross-range resolution. Further, in a radar frame, localization and identification capacity of a significant object is still away from quality and/or resolution that is suitable for full-level autonomous driving.

SUMMARY

It is an object of some embodiments to address object recognition problem in automotive radar used for autonomous driving. While radars are cost-effective and robust in all-weather conditions for perception in the autonomous driving, radar measurements suffer from low angular resolution and precision in recognizing surrounding objects. To enhance capacity of the automotive radar, some embodiments exploit temporal information from a sequence of radar image frames to enhance quality and/or resolution of object recognition using the automotive radar. Hence, it is an object of some embodiments to leverage consistency of an object's existence and features to model relations between the objects within the sequence of radar image frames. The sequence of radar image frames is indicative of the radar measurements of a scene at different consecutive instances of time. The scene may include one or multiple objects such as vehicles.

Some embodiments are based on an understanding that it is possible to extract various features from the sequence of radar image frames and place these features in context of each other to take advantage of temporal correlations among the sequence of radar image frames. However, while such an approach may be practical for other modalities like camera images and speech signals, this approach does not provide a satisfactory result for radar object recognition suitable for the autonomous driving due to low semantic features manifested by the current automotive radar quality.

Some embodiments are based on a recognition that nature and number of features in each radar image frame is one of the reasons for degrading a quality of the temporal correlations among the radar image frames of the sequence of radar image frames. For example, in contrast with camera image frames, the features of the radar image frames are semantically poor, which makes the temporal correlation harder. Further, versatility and rapid change of traffic situation can alter related features in the radar image frames. Such alteration may be corrected based on semantics of the related features, but as mentioned above, the features of the radar image frames are semantically poor. In combination, such a nature of the radar image frames degrades ability to train a neural network suitable for the object recognition in the autonomous driving using the automotive radar.

Some embodiments are based on the realization that these problems can be addressed by feature extraction with the temporal correlation on an object level. The multi-directional feature extraction allows extracting jointly the features from the radar image frames to provide different temporal views on a feature level. In contrast, enforcing the temporal correlation on the object level (as contrasted with the feature level) allows for correlated high-level features of detected objects unavailable on the feature level. Hence, the temporal correlation is enforced at least twice on both the feature level and the object level to improve the quality of the temporal correlations.

Hence, it is an object of some embodiments to provide a system taking advantage from machine learning that can incorporate the temporal correlation of consecutive radar image frames on the feature and object levels into a single framework. Additionally or alternatively, it is an object of some embodiments to provide principles of the temporal correlation on the feature level different from principles of the temporal correlation on the object level to enhance quality of joint temporal correlation.

Some embodiments are based on the realization that the temporal correlation on the feature level can be performed by extracting features from different permutations of frames in the sequence of radar image frames based on an order of the frames in each of the permutations. For example, the sequence of radar image frames includes a current frame and a previous frame. An order of frames in the sequence of radar image frames is permuted to produce multiple permuted sequences of radar image frames with different frames at a dominant position in a corresponding permuted sequence of radar image frames. For example, a first permuted sequence is produced with the current frame at the dominant position and the previous frame at a subordinate position. Similarly, a second permuted sequence is produced with the previous frame at the dominant position and the current frame at the subordinate position. The dominant position refers to a first position or a last position in the sequence of radar image frames and the subordinate position refers to a position other than the dominant position. Here, the dominant position is considered to be the first position.

Further, each permuted sequence of radar image frames is processed with a first neural network. The first neural network is trained to extract features of a frame at the dominant position in a temporal correlation with features of one or multiple frames in the subordinate position to produce temporally enhanced features for each of the frames in the sequence of radar image frames. For example, the first permuted sequence is processed with the first neural network to extract features of the current frame in a temporal correlation with features of the previous frame to produce temporally enhanced features of the current frame. Similarly, the second permuted sequence is processed with the first neural network to extract features of the previous frame in a temporal correlation with features of the current frame to produce temporally enhanced features of the previous frame. Hence, the order of permutation in the sequence of radar image frames allows creating a sequence of features with temporal correlation but with emphasis on different frames in the sequence of radar images. In such a manner, the temporal correlation of the features on the feature level can be performed in a manner that allows subsequent correlation on the object level.

To perform the temporal correlation on the object level, some embodiments produce feature maps based on the temporally enhanced features of the current frame and the temporally enhanced features of the previous frame, respectively. Further, the feature maps are processed with a second neural network to correlate the feature maps with each other. For example, some embodiments use an attention mechanism to place the feature map produced based on the temporally enhanced features of the current frame in context of the feature map produced based on produced from a sequence of radar image frames with the previous frame at the dominant position, and/or vice versa.

Accordingly, one embodiment discloses a radar system for detecting and tracking one or multiple objects. The radar system comprises a processor; and a memory having instructions stored thereon that, when executed by the processor, cause the radar system to: collect a sequence of radar image frames indicative of radar measurements of a scene at different consecutive instances of time, the scene including the one or multiple objects, wherein the sequence of radar image frames includes a current frame and at least one previous frame; permute an order of frames in the sequence of radar image frames to produce multiple permuted sequences of radar image frames with different frames at a dominant position in a corresponding permuted sequence of radar image frames; process each permuted sequence of radar image frames with a first neural network trained to extract features of a frame at the dominant position in a temporal correlation with features of one or multiple frames in a subordinate position to produce temporally enhanced features for each of the frames in the sequence of radar image frames; reconstruct a feature map indicative of one or multiple properties of the one or multiple objects in the scene from the temporally enhanced features of each of the frames in the sequence of radar image frames to produce a sequence of feature maps; process a list of feature vectors from each feature map of the sequence of feature maps with a second neural network trained to aggregate the one or multiple properties of an object in one feature map with the one or multiple properties of the object in another feature map to produce temporally enhanced heatmaps, wherein each feature vector is supplemented with a position encoding; and processing the temporally enhanced heatmaps based on one or multiple regression heads to generate at least one property of the one or multiple objects.

Accordingly, another embodiment discloses a method for detecting and tracking one or multiple objects. The method comprises collecting a sequence of radar image frames indicative of radar measurements of a scene at different consecutive instances of time, the scene including the one or multiple objects, wherein the sequence of radar image frames includes a current frame and at least one previous frame; permuting an order of frames in the sequence of radar image frames to produce multiple permuted sequences of radar image frames with different frames at a dominant position in a corresponding permuted sequence of radar image frames; processing each permuted sequence of radar image frames with a first neural network trained to extract features of a frame at the dominant position in a temporal correlation with features of one or multiple frames in a subordinate position to produce temporally enhanced features for each of the frames in the sequence of radar image frames; reconstructing a feature map indicative of one or multiple properties of the one or multiple objects in the scene from the temporally enhanced features of each of the frames in the sequence of radar image frames to produce a sequence of feature maps; processing a list of feature vectors from each feature map of the sequence of feature maps with a second neural network trained to aggregate the one or multiple properties of an object in one feature map with the one or multiple properties of the object in another feature map to produce temporally enhanced heatmaps, wherein each feature vector is supplemented with a position encoding; and processing the temporally enhanced heatmaps based on one or multiple regression heads to generate at least one property of the one or multiple objects.

Accordingly, yet another embodiment discloses a non-transitory computer-readable storage medium embodied thereon a program executable by a processor for performing a method for detecting and tracking one or multiple objects. The method comprises collecting a sequence of radar image frames indicative of radar measurements of a scene at different consecutive instances of time, the scene including the one or multiple objects, wherein the sequence of radar image frames includes a current frame and at least one previous frame; permuting an order of frames in the sequence of radar image frames to produce multiple permuted sequences of radar image frames with different frames at a dominant position in a corresponding permuted sequence of radar image frames; processing each permuted sequence of radar image frames with a first neural network trained to extract features of a frame at the dominant position in a temporal correlation with features of one or multiple frames in a subordinate position to produce temporally enhanced features for each of the frames in the sequence of radar image frames; reconstructing a feature map indicative of one or multiple properties of the one or multiple objects in the scene from the temporally enhanced features of each of the frames in the sequence of radar image frames to produce a sequence of feature maps; processing a list of feature vectors from each feature map of the sequence of feature maps with a second neural network trained to aggregate the one or multiple properties of an object in one feature map with the one or multiple properties of the object in another feature map to produce temporally enhanced heatmaps, wherein each feature vector is supplemented with a position encoding; and processing the temporally enhanced heatmaps based on one or multiple regression heads to generate at least one property of the one or multiple objects.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 5 shows an algorithm for multiple object tracking, according to an embodiment of the present disclosure.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1:
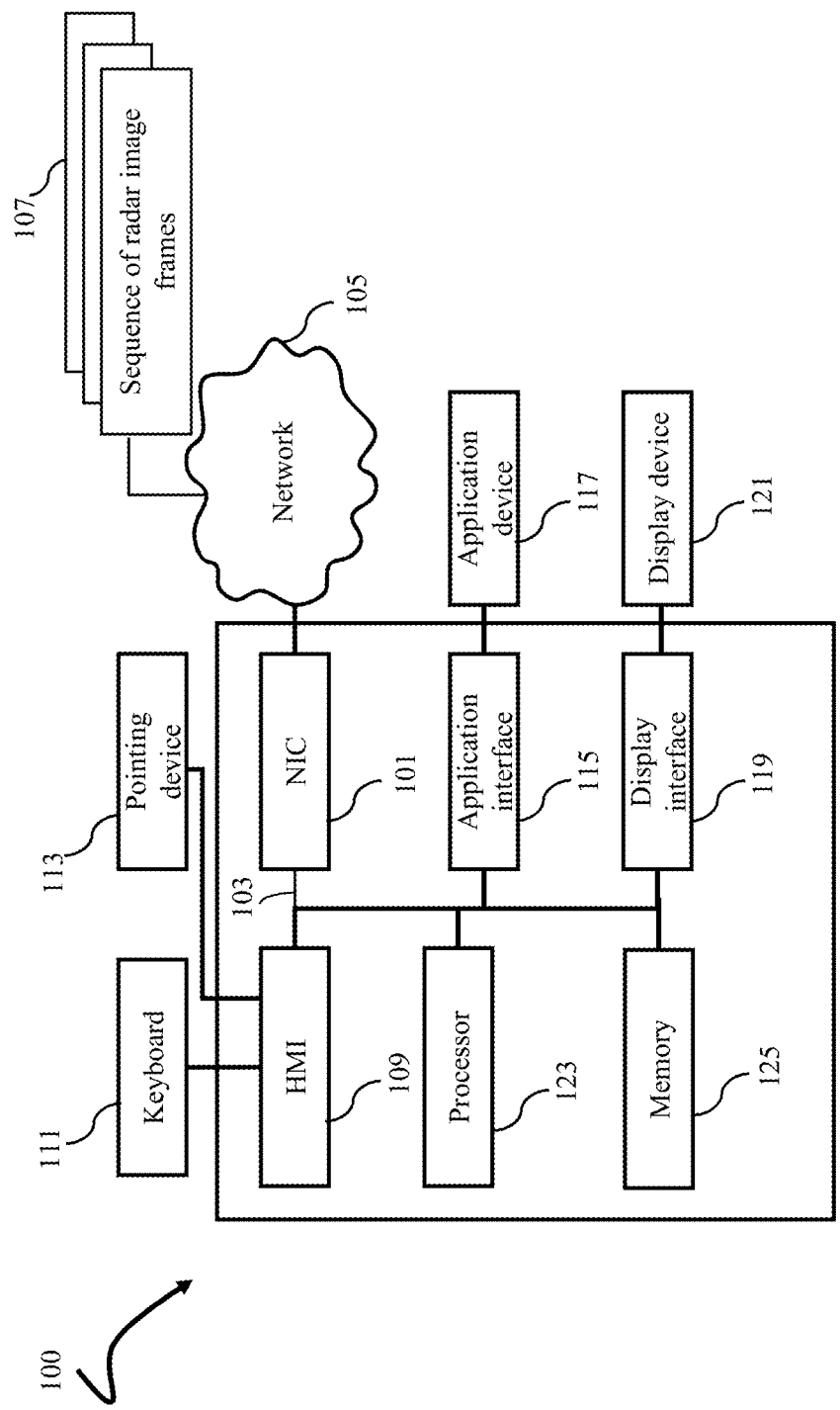
FIG. 1 shows a block diagram of a radar system for detecting and tracking one or multiple objects, according to an embodiment of the present disclosure.

FIG. 1 shows a block diagram of a radar system 100 for detecting and tracking one or multiple objects, according to an embodiment of the present disclosure. The radar system 100 includes a network interface controller (NIC) 101 adapted to connect the radar system 100 through a bus 103 to a network 105 (also referred to as communication channel). Through the network 105, either wirelessly or through wires, the radar system 100 collects a sequence 107 of radar image frames. The sequence 107 of radar image frames is indicative of radar measurements of a scene at different consecutive instances of time. The scene may include the one or multiple objects such as vehicles.

Further, in some implementations, a human machine interface (HMI) 109 within the radar system 100 connects the radar system 100 to a keyboard 111 and a pointing device 113. The pointing device 113 may include a mouse, trackball, touchpad, joystick, pointing stick, stylus, or touchscreen, among others. Further, the radar system 100 includes an application interface 115 to connect the radar system 100 to an application device 117 for performing various operations. Additionally, the radar system 100 may be linked through the bus 103 to a display interface 119 adapted to connect the radar system 100 to a display device 121, such as a computer monitor, television, projector, or mobile device, among others.

The radar system 100 further includes a processor 123 and a memory 125 that stores instructions that are executable by the processor 123. The processor 123 may be a single core processor, a multi-core processor, a computing cluster, or any number of other configurations. The memory 125 may include random access memory (RAM), read only memory (ROM), flash memory, or any other suitable memory system. The processor 123 is connected through the bus 103 to one or more input and output devices. The stored instructions implement a method for tracking the objects present in the scene.

It is an object of some embodiments to address object recognition problem in automotive radar used for autonomous driving. While radars are cost-effective and robust in all-weather conditions for perception in the autonomous driving, the radar measurements suffer from low angular resolution and precision in recognizing surrounding objects. To enhance capacity of the automotive radar, some embodiments exploit temporal information from the sequence 107 of radar image frames to enhance quality and/or resolution of object recognition. Hence, it is an object of some embodiments to leverage consistency of an object's existence and features to model relations between the objects within the sequence 107 of radar image frames.

Some embodiments are based on the understanding that it is possible to extract various features from the sequence 107 of radar image frames and place these features in context of each other to take advantage of temporal correlations among the sequence 107 of radar image frames. However, while such an approach may be practical for other modalities like camera images and speech signals, this approach does not provide a satisfactory result for radar object recognition suitable for the autonomous driving.

Some embodiments are based on a recognition that nature and number of features in each radar image frame is one of reasons for degrading a quality of the temporal correlations the radar image frames of the sequence 107 of radar image frames. For example, in contrast with camera image frames, the features of the radar image frames are semantically poor, which makes the temporal correlation harder. Further, versatility and rapid change of traffic situation can alter related features in the radar image frames. Such alteration may be corrected based on semantics of the related features, but as mentioned above, the features of the radar image frames are semantically poor. In combination, such a nature of the radar image frames degrades ability to train a neural network suitable for the object recognition in the autonomous driving using the automotive radar.

Some embodiments are based on the realization that these problems can be addressed by feature extraction with the temporal correlation on an object level. The multi-directional feature extraction allows extracting jointly the features from the radar image frames to provide different temporal views on a feature level. In contrast, enforcing the temporal correlation on the object level (as contrasted with the feature level) allows for correlated high-level features of detected objects unavailable on the feature level. Hence, the temporal correlation is enforced at least twice on both the feature level and object level to improve the quality of the temporal correlations.

To that end, some embodiments provide a framework that incorporates the temporal correlation at the feature level and the object level.

Figure 2A:
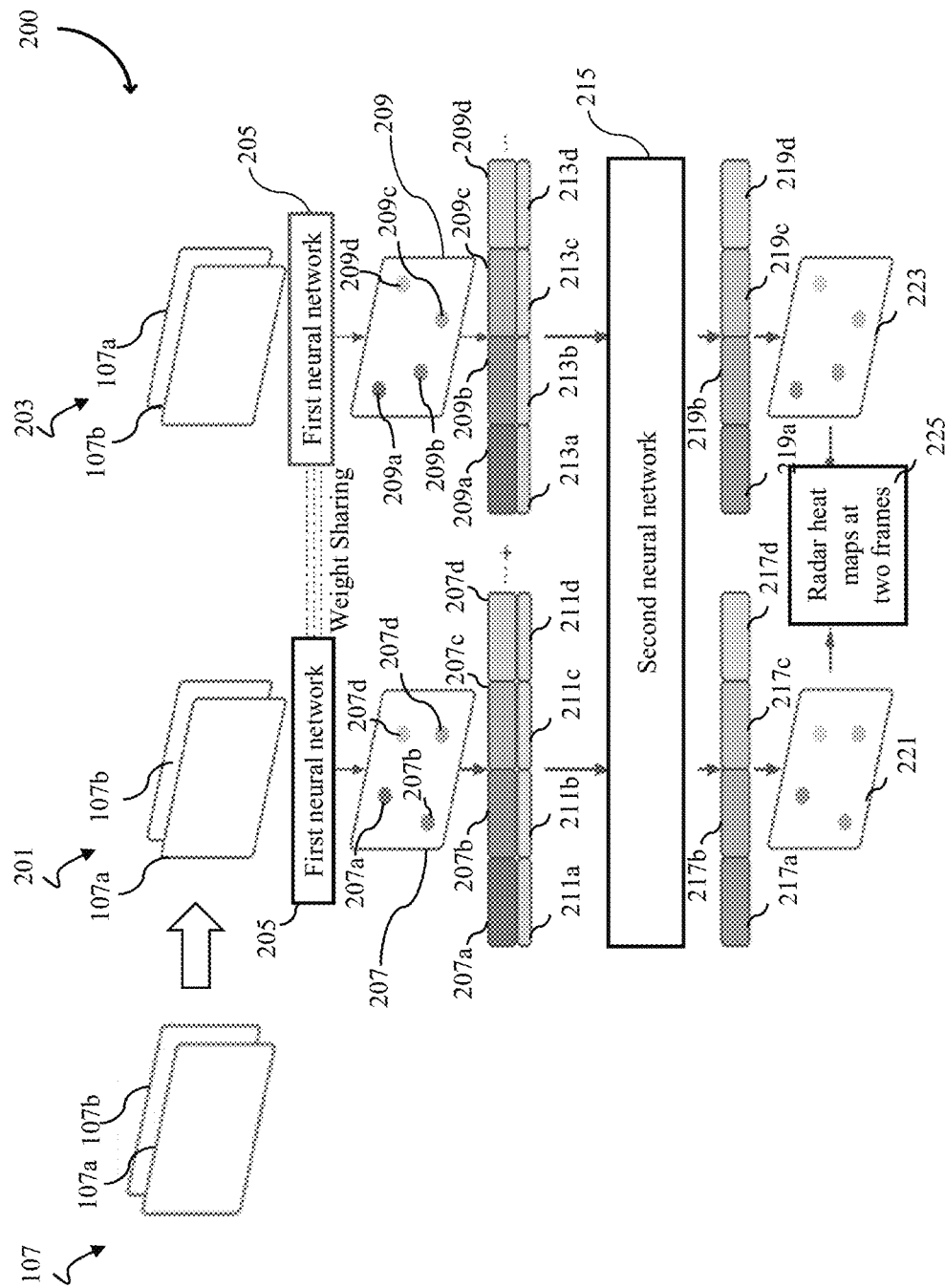
FIG. 2A shows a schematic of a framework that incorporates temporal correlation at a feature level and an object level for object recognition, according to an embodiment of the present disclosure.

FIG. 2A shows a schematic of a framework 200 that incorporates the temporal correlation at the feature level and the object level for the object recognition, according to an embodiment of the present disclosure. According to an embodiment, the sequence 107 of radar image frames includes a current frame 107a and a previous frame 107b. Additionally or alternatively, the sequence 107 of radar image frames may include multiple previous frames. For ease of explanation, a single previous frame is considered.

The processor 123 permutes an order of frames in the sequence 107 of radar image frames to produce multiple permuted sequences of radar image frames with different frames at a dominant position in a corresponding permuted sequence of radar image frames. For example, the processor 123 produces a first permuted sequence 201 with the current frame 107a at the dominant position and the previous frame 107b at a subordinate position. Similarly, the processor 123 produces a second permuted sequence 203 with the previous frame 107b at the dominant position and the current frame 107a at the subordinate position. The dominant position refers to a first position or a last position in the sequence of radar image frames and the subordinate position refers to a position other than the dominant position. Here, the dominant position is considered to be the first position.

Further, the processor 123 processes each permuted sequence of radar image frames with a first neural network 205. The first neural network 205 is trained to extract features of a frame at the dominant position in a temporal correlation with features of one or multiple frames in the subordinate position to produce temporally enhanced features for each of the frames in the sequence 107 of radar image frames. For example, the processor 123 processes the first permuted sequence 201 with the first neural network 205 to extract features of the current frame 107a in a temporal correlation with features of the previous frame 107b to produce temporally enhanced features of the current frame 107a Similarly, the processor 123 processes the second permuted sequence 203 with the first neural network 205 to extract features of the previous frame 107b in a temporal correlation with features of the current frame 107a to produce temporally enhanced features of the previous frame 107b. Weights of the first neural network 205 are shared for processing the first permuted sequence 201 and the second permuted sequence 203.

Further, based on the temporally enhanced features of the current frame 107a and the temporally enhanced features of the previous frame 107b, the processor 123 reconstructs a feature map 207 and a feature map 209 to represent the temporally enhanced features for the dominant frames of the input sequences 201 and 203, respectively. The feature maps 207 and 209 include feature vectors with each feature vector representing a potential object, primarily from the dominant radar image frame. Additionally, the feature vectors may be indicative of one or multiple properties of the objects, such as position, orientation, a curvature of corner of the objects, a length and width of the objects.

Further, the processor 123 selects a list of feature vectors from the feature maps 207 and 209, respectively, based on a selection criterion. For example, in an embodiment, the processor 123 selects feature vectors with top-k activations from the feature maps 207 and 209, respectively. For example, feature vectors 207a, 207b, 207c, and 207d are the feature vectors selected from the feature map 207. Likewise, feature vectors 209a, 209b, 209c, and 209d are the feature vectors selected from the feature map 209. The processor 123 selects these feature vectors and submits to the second neural network 215 for performing the temporal correlation on the object level.

However, some embodiments are based on recognition that the selected features 207a-d and 209a-d may not encompass absolute positional information into the feature maps 207 and 209. However, the positional information is crucial in object temporal relations because the objects at a spatial distance in two successive radar image frames are more likely to be associated and may share similar object's properties. To that end, prior to submitting the selected feature vectors to the second neural network 215, each selected feature vector is supplemented by a positional encoding via feature concatenation. For example, the selected feature vectors 207a, 207b, 207c, and 207d are supplemented with positional encodings 211a, 211b, 211c, and 211d, respectively. Similarly, the selected feature vectors 209a, 209b, 209c, and 209d are supplemented with positional encodings 213a, 213b, 213c, and 213d, respectively. Further, such selected feature vectors supplemented with respective positional encodings are processed with the second neural network 215.

The second neural network 215 is trained to aggregate the one or multiple properties of an object in the feature map 207 with the one or multiple properties of the object in another feature map 209 to produce temporally enhanced heatmaps. In particular, the second neural network 215 is trained to aggregate the selected feature vectors 207a, 207b, 207c, and 207d of the feature map 207 with the selected feature vectors 209a, 209b, 209c, and 209d of the feature map 209 and produce updated feature vectors 217a, 217b, 217c, and 217d for the feature map 207 and updated feature vectors 219a, 219b, 219c, and 219d for the feature map 209.

Figure 2B:
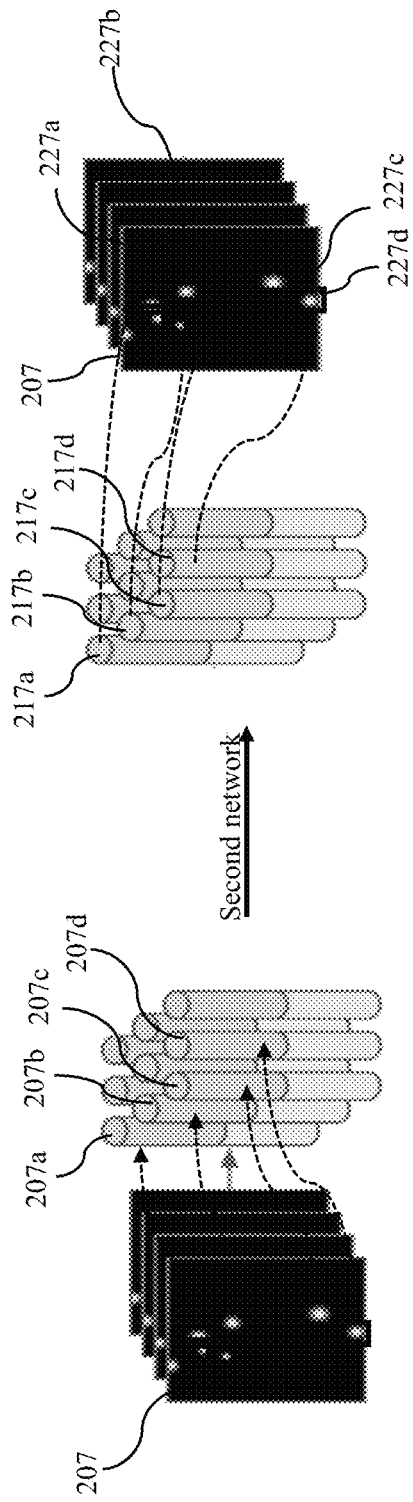
FIG. 2B shows a schematic illustrating an example of placing back updated feature vectors to a feature map, according to an embodiment of the present disclosure.

Further, based on the updated feature vectors 217a, 217b, 217c, and 217d, the processor 123 produces a temporally enhanced heatmap 221. Based on the updated feature vectors 219a, 219b, 219c, and 219d, the processor 123 produces a temporally enhanced heatmap 223. Specifically, in an embodiment, the updated feature vectors 217a-d and 219a-d are placed back to the feature maps of 207 and 209, respectively, according to their spatial location, and the temporally enhanced heatmaps 221 and 223 are produced via a learnable module/head. An example of placing back the updated feature vectors 217a-d to the feature map of 207 is illustrated in FIG. 2B. The feature vectors 207a, 207b, 207c, and 207d selected from the feature map 207 are processed with the second neural network 215 to produce the updated feature vectors 217a, 217b, 217c, and 217d. The updated feature vectors 217a, 217b, 217c, and 217d are placed back to the feature map 207 according to their spatial locations 227a, 227b, 227c, and 227d, respectively. In a similar manner, the updated feature vectors 219a, 219b, 219c, and 219d are placed back to the feature map 209 according to their spatial locations.

Further, in an embodiment, the processor 123 submits the temporally enhanced heatmaps 221 and 223 to different regression heads (with trainable parameters) to generate heatmaps, position, orientation, length and width of the objects. The processor 123 compares the temporally enhanced heatmaps 221 and 223 with corresponding ground truths to compute a loss function. The loss function is used to train the first neural network 205 and the second neural network 215 to learn the temporally enhanced features. In an embodiment, the ground truths may be constructed from labeled bounding boxes at the two frames 107a and 107b, using 2D Gaussian spread functions. In an alternate embodiment, the processor 123 reconstructs a radar image 225 based on the temporally enhanced heatmap 221 and the temporally enhanced heatmap 223. Additionally or alternatively, one embodiment uses a weighted combination of the temporally enhanced heatmap 221 and the temporally enhanced heatmap 223 to reconstruct the radar image 225. In such a manner, the framework 200 can also consider the temporal correlations on level of the radar image reconstruction. As a result, the temporal consideration is extended to three levels, i.e., the feature level, the object level, and the radar image reconstruction level.

Figure 3:
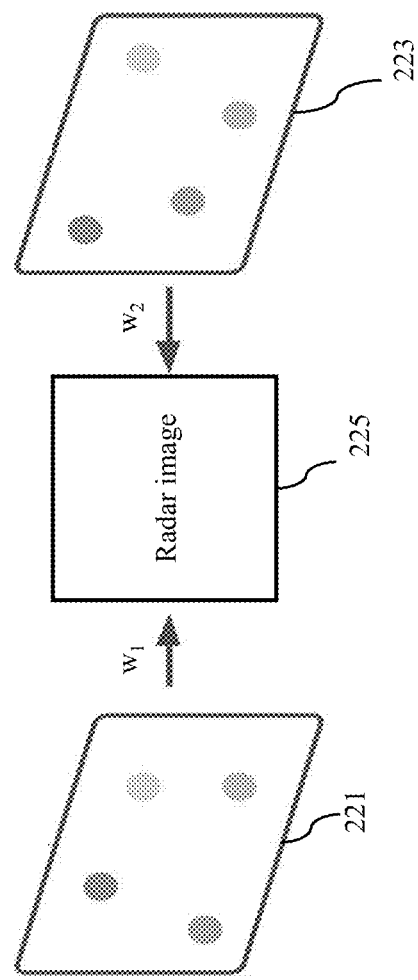
FIG. 3 shows a schematic for reconstructing a radar image using a weighted combination of temporally enhanced heatmaps, according to an embodiment of the present disclosure.

FIG. 3 shows a schematic for reconstructing the radar image 225 using the weighted combination of the temporally enhanced heatmap 221 and the temporally enhanced heatmap 223, according to an embodiment of the present disclosure. For example, in the weighted combination, a weight $w_1$ is associated with the temporally enhanced heatmap 221 and a weight $w_2$ is associated with the temporally enhanced heatmap 223. In different embodiments, the weights $w_1$ and $w_2$ in the weighted combination are the same or different. In some embodiments, the weights $w_1$ and $w_2$ in the weighted combination are predetermined or determined adaptively online during the radar image reconstruction. In different embodiments, the weighted combination is determined analytically or learned using a neural network trained to accept input data indicative of the temporally enhanced heatmaps 221 and 223 to output the radar image 225. The neural network, for example, corresponds to a ResNet, EfficientNet, or a convolution neural network.

According to an embodiment, the first neural network 205 in the framework 200 is a convolutional neural network (CNN) with or without skip connections. For example, in one embodiment, the CNN is a deep convolutional neural network with skip connections for multi-scale feature extraction and ensemble. Such a CNN is advantageous because it can process jointly multiple radar image frames based on their order. For example, the deep convolutional neural network can accept the sequence 107 of radar image frames stacked in a tensor to form a multi-channel radar image. The deep convolutional neural network is trained using a loss function minimizing errors of an output of the deep convolutional neural network with ground truth information of a frame in the dominant position. The deep convolutional neural network with skip connections is explained below in FIG. 4.

Figure 4:
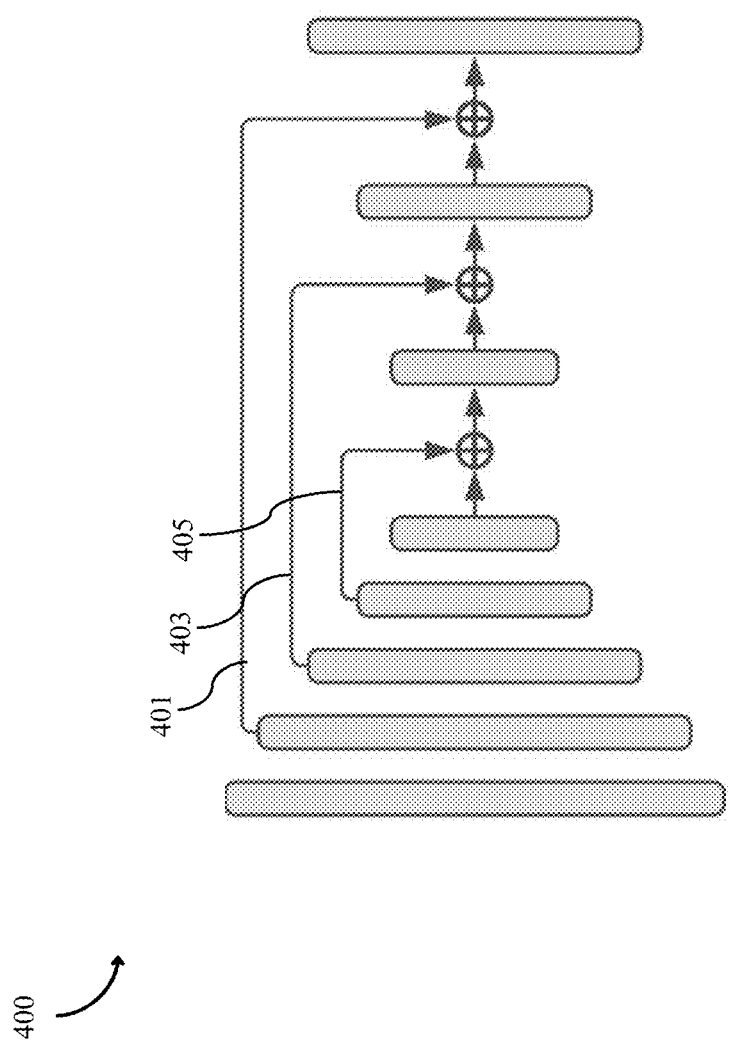
FIG. 4 shows a schematic illustrating a deep convolutional neural network with skip connections, according to an embodiment of the present disclosure.

FIG. 4 shows a schematic illustrating a deep convolutional neural network 400 with skip connections, according to an embodiment of the present disclosure. Let 0 denote learnable parameters in the deep convolutional neural network 400, and for simplification, notations of the learnable parameters are unified with 0 for different neural networks of the present disclosure. A bracket following a three-dimensional matrix is used to represent feature gathering process at certain coordinates. Consider a feature map $Z \in \mathbb{R}^{C \times H \times W}$ with C, H, and W representing channel, height, and width, respectively. Let P represent a coordinate (x, y) or a set of two-dimensional coordinates $\{(x, y)\}K$ with cardinality equal to K and x, y $\in \mathbb{R}$. Z[P] means taking the feature vector at a coordinate system indicated by P along width and height dimensions, with returned features in $\mathbb{R}^C$ or $\mathbb{R}^{K \times C}$.

Further, a single radar image frame may be denoted as $I \in \mathbb{R}^{1 \times H \times W}$ Two successive radar image frames: the current frame 107a and the previous frame 107b are concatenated, along the channel dimension to involve the temporal information at an input level. The channel concatenated temporal input image for the current and previous frames can be respectively written as $I_{c+p}$ and $I_{p+c} \in \mathbb{R}^{2 \times H \times W}$. The order of 'current' c and 'previous' p in the subscript indicates feature-concatenating order of these two frames. The feature maps are obtained by forwarding the inputs $I_{c+p}$ and $I_{p+c}$ through the deep convolutional neural network 400 $\mathcal{F}_\theta(\cdot)$:

$$Z_c := \mathcal{F}_\theta(I_{c+p}), Z_p := \mathcal{F}_\theta(I_{p+c}) \qquad (1)$$

The deep convolutional neural network $\mathcal{F}_\theta(\cdot)$ 400 may also be referred to as backbone neural network. Skip connections 401, 403, and 405 within the deep convolutional neural network 400 are configured to jointly involve high-level semantics and low-level finer details in the feature maps. For one skip connection, features from a deep layer are up sampled to align its size with the feature from previous shallow layers, via bilinear interpolation. Further, one or a combination of operations such as convolution, non-linear activation, and batch normalization are applied to the up-sampled features. Further, the up-sampled features are concatenated with those from the shallow layers along the channel dimension. Three skip connections 401, 403, and 405 are inserted within the deep convolutional neural network 400 to drive the features embrace semantics at four different levels. In some other embodiments, skip connections may be less or more than three. The feature maps from the deep convolutional neural network 400 are resulted in c, $$Z_p \in \mathbb{R}^{C \times \frac{H}{s} \times \frac{W}{s}},$$

where s is a down-sampling ratio over a spatial dimension.
Further, a filtering module $$\mathcal{G}_\theta^{pre-hm}: \mathbb{R}^{C \times \frac{H}{s} \times \frac{W}{s}} \to \mathbb{R}^{1 \times \frac{H}{s} \times \frac{W}{s}}$$

is applied on $Z_c$ and $Z_p$ to select top-k potential object features. A set of coordinates $P_c$ for potential objects in $Z_c$ is obtained via the following equation:

$$P_c := \{(x,y) | \mathcal{G}_\theta^{pre-hm}(Z_c)_{xy} \geq [\mathcal{G}_\theta^{pre-hm}(Z_c)]_K\} \qquad (2)$$

where $[\mathcal{G}_\theta^{pre-hm}(Z_c)_K]$ is the K-th largest value in $\mathcal{G}_\theta^{pre-hm}(Z_c)$ over spatial space $$\frac{H}{s} \times \frac{W}{s},$$

and the subscript xy denotes taking value at coordinate (x,y). The cardinality of $P_c$ is $|P_c|=K$. By substituting $Z_p$ into Eq. (2), $P_p$ for $Z_p$ can be obtained similarly. By taking the coordinate sets $P_c$ and $P_p$ into the feature maps, a selective feature matrix is given as:

$$H_c := Z_c[P_c], H_p := Z_p[P_p] \qquad (3)$$

Sequentially, let $H_{c+p} := [H_c, H_p]^T \in \mathbb{R}^{2K \times C}$ denote matrix concatenation of top-K selected features that forms input to the second neural network 215. Additionally, the top-K selected features are supplemented with respective positional encodings before passing $H_{c+p}$ into the second neural network 215. Denote $H_{c+p}^{pos} \in \mathbb{R}^{2K \times (C+D_{pos})}$ the feature supplemented by the positional encoding via the feature concatenation, where $D_{pos}$ is a dimension of the positional encoding. The positional encoding is projected from a normalized 2D coordinate (x, y) that takes values in [0, 1] via linear mappings.

In some embodiments, the second neural network 215 uses an attention mechanism, such as self-attention, to aggregate properties of the objects in context of each other. The self-attention is advantageous because the same object co-occurrence cannot always be guaranteed in successive radar image frames since an object can move out of scope, thereby the self-attention is desirable when an object is missing in one radar image frame. In an embodiment, the second neural network 215 includes a single 1-th temporal relational layer or multiple relational layers with identical design. For the single 1-th temporal relational layer, a superscript l is used to denote an input feature and l+1 to denote an output feature:

$$H_{c+p}^{l+1} = \text{softmax}\left(\frac{M + q(H_{c+p}^{l,pos})k(H_{c+p}^{l,pos})^T}{\sqrt{d}}\right)v(H_{c+p}^l), \quad (4)$$

where q(•), k(•), and v(•) are linear transformation layers applied to the features and are referred as, respectively, query, keys, and values. d is the dimension of query and keys and is used to scale a dot product between them. A masking matrix $M \in \mathbb{R}^{2K \times 2K}$ is defined as:

$$M := \sigma \cdot \left(\begin{bmatrix} 1_{K,K} & 0_{K,K} \\ 0_{K,K} & 1_{K,K} \end{bmatrix} - \mathbb{1}_{2K}\right), \quad (5)$$

where $1_{K,K}$ is all-one matrix with size K×K, $0_{K,K}$ is all-zero matrix with size K×K, $\mathbb{1}_{2K}$ is an identity matrix of size 2K, and σ is a negative constant which is set to −(1e+10) to guarantee a near-zero value in the output through softmax Diagonal matrices of $1_{K,K}$ disable the self-attention between the features from the same frame, while off-diagonal matrices of $0_{K,K}$ allow cross-frame attention. Also, the identity matrix $\mathbb{1}_{2K}$ unlocks the self-attention. It can be noted that the positional encoding is only attached to the keys and the query but not to the values, thus the output feature does not involve locality. After executing the object temporal attention in Eq. (4), sequentially a feed-forward function, which consists of two linear layers, layer normalization, and shortcut on features, is applied. The output feature $H_{c+p}^{l+1}$ is split into $H_c^{l+1}$ and $H_p^{l+1}$ and refill the feature vector to $Z_c$ and $Z_p$ in the corresponding spatial coordinates from $P_c$ and $P_p$.

Further, in some embodiments, regressions are applied on Zc and $Z_p$ to obtain object's properties, such as center coordinates, orientation, length and width, and the like.

For example, to localize the objects, 2D coordinate of a peak value in the heatmaps of 221 and 223 is considered as a center of an object. The heatmaps are obtained by a module $$\mathcal{G}_\theta^{hm}: \mathbb{R}^{C \times \frac{H}{s} \times \frac{W}{s}} \to \mathbb{R}^{1 \times \frac{H}{s} \times \frac{W}{s}}$$

followed by a sigmoid function, applied on Zc and Zp. A ground-truth feature map is generated by placing a 2D radial basis function (RBF) kernel on center of every ground-truth object, while parameter σ in the RBF kernel is set proportional to the object's width and length. Based on sparsity of the objects in the radar image frames, a focal loss is used to balance regression of ground-truth centers and background, and drive predicted heatmaps 221 and 223 to approximate the ground-truth heatmaps. Let $h_i$ and $\hat{h}_i$ denote the ground-truth and predicted value at i-th coordinate, N a total number of values in the feature map, the focal loss is given as:

$$L_h := -\frac{1}{N}\sum_i \left(I_{h_i=1}(1-\hat{h}_i)^\alpha \log(\hat{h}_i) + I_{h_i \neq 1}(1-\hat{h}_i)^\beta \hat{h}_i^\alpha \log(1-\hat{h}_i)\right), \quad (6)$$

where α and β are hyper-parameters and are chosen empirically with 2 and 4, respectively. The same loss function is conducted for $\mathcal{G}_\theta^{pre-hm}$ to rectify the feature vectors selection. During inference, a threshold is set on the feature map to distinguish the object center from the background.

Additionally, in some embodiments, the width and length of the object is predicted from the feature vector positioned at the center coordinate in the feature map through another regression head $\mathcal{G}_\theta^b: \mathbb{R}^C \to \mathbb{R}^2$. Let $P_{gt}^k$ denote the coordinate (x, y) of the center of k-th ground-truth object, $b^k$ a ground-truth vector containing width and length of k-th object, and Z a unified notation for $Z_c$ and $Z_p$. Regression for the width and length may be given as:

$$L_b := \frac{1}{N}\sum_{k=1}^N \text{Smooth}_{L_1}(\|\mathcal{G}_\theta^b(Z[P_{gt}^k]) - b^k\|), \quad (7)$$

where the $L_1$ smooth loss is defined as:

$$\text{Smooth}_{L_1}(x) := \begin{cases} 0.5x^2 & \text{if } |x| < 1 \\ |x| - 0.5 & \text{otherwise} \end{cases} \quad (8)$$

Further, in some embodiments, the object's orientation is predicted. An angle range in [0°, 360°) can be measured by a deviation between the object's orientation and a boresight direction of an ego vehicle. Sine and cosine values of angle $\vartheta$ may be regressed via $\mathcal{G}_\theta^r: \mathbb{R}^C \to \mathbb{R}^2$:

$$L_r := \frac{1}{N}\sum_{k=1}^N \text{Smooth}_{L_1}((\|\mathcal{G}_\theta^r(Z[P_{gt}^k]) - (\sin(\vartheta), \cos(\theta))\|), \quad (9)$$

During the inference stage, the orientation can be predicted by $\sin(\hat{\vartheta})$ and $\cos(\hat{\vartheta})$ via $\arctan(\sin(\hat{\vartheta})/\cos(\hat{\vartheta}))$.

According to an embodiment, down sampling in the first neural network 205 may incur a center coordinate shift for every object. The center coordinates in the feature map are integers while true coordinates are likely to be off the feature map grids due to spatial down sampling. To compensate for the shift, a ground-truth offset is calculated for the k-th object as:

$$o^k := \left(\frac{c_x^k}{s} - \left[\frac{c_x^k}{s}\right], \frac{c_y^k}{s} - \left[\frac{c_y^k}{s}\right]\right), \quad (10)$$

where $c_x^k$ and $c_y^k$ is the k-th center coordinate, s is the down-sampling ratio, and bracket [•] is a rounding operation to an integer. Having $\mathcal{G}_\theta^o: \mathbb{R}^C \to \mathbb{R}^2$, regression for center positional offset can be expressed as:

$$L_0 := \frac{1}{N}\sum_{k=1}^{N}\text{Smooth}_{L_1}\left(\|\mathcal{G}_\theta^0(Z[P_{gt}^k]) - o^k\|\right) \qquad (11)$$

According to an embodiment, the above regression functions compose a training objective by a linear combination as:

$$\min_\theta L := L_h + L_b + L_r + L_0 \qquad (12)$$

For simplification, balanced factors for each term are omitted. The training objective is the loss function used to train parameters in the first neural network 205 and the second neural network 215. The parameters include weights in the first neural network 205 and the second neural network 215 and regression heads (e.g., a heatmap head, a length/width regression head, an orientation head, and the like). For each training step, loss L is calculated and backward is executed for both the current frame 107a and the previous frame 107b simultaneously. Standing at the current frame 107a, the objects in the current frame 107a receives information from the previous frame 107b for the object recognition. On the other hand, from the previous frame perspective, the objects utilize the temporal information from the immediate future frame. Therefore, the training objective (12) can be contemplated as a bi-directional backward-forward training towards two successive frames.

Different embodiments use different machine learning paradigms to train the first neural network 205 and/or the second neural network 215. For example, one embodiment provides end-to-end multi-branch training with each branch designed for different permuted sequences of radar image frames, where end-to-end refers to learning the first neural network 205 and/or the second neural network 215 from an input to an output and the multi-branch refers to two branches for the current frame and the previous frame.

Some embodiments are based on a realization that the framework 200 can be extended for multiple object tracking. For multiple object tracking, a regression head is added to a center feature vector to predict a 2D moving offset between a center of an object holding the same tracking ID in the current and previous frames. Further, for associating objects from successive frames, Euclidean distance is used. An algorithm for multiple object tracking is explained below in FIG. 5.

FIG. 5 shows an algorithm 500 for multiple object tracking, according to an embodiment of the present disclosure. Specifically, the algorithm 500 pairs N detected objects with M previously tracked objects based on their Euclidean distance. For instance, $W_{ij}$ in line 2 computes an offset-compensated distance between an object i of the detected objects and the previously tracked object ID j. Based on whether the offset-compensated distance is larger or smaller than a distance threshold k, the object i may be merged with the previously tracked object ID j.

Figure 6:
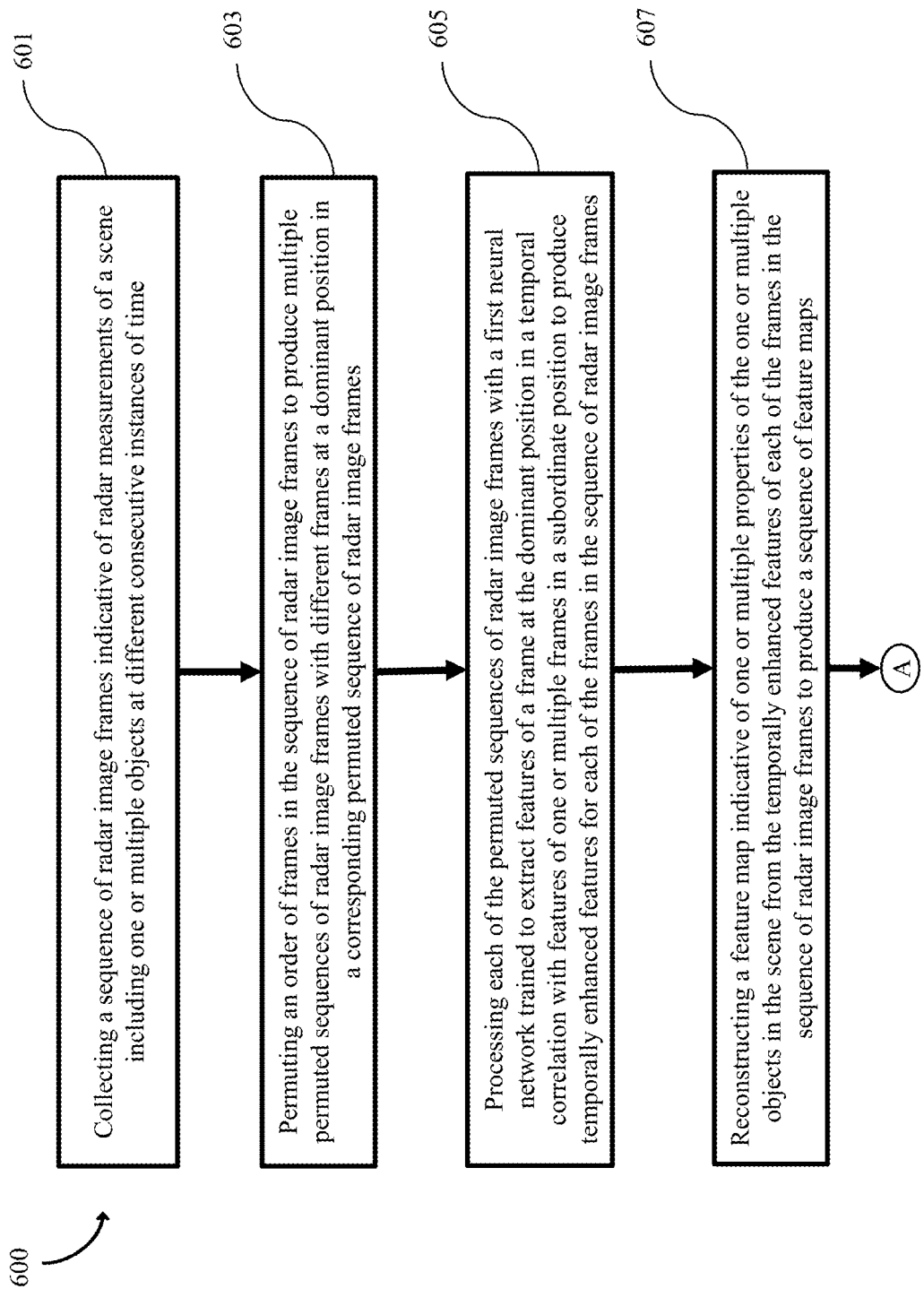
FIG. 6 shows a block diagram of a method for detecting and tracking one or multiple objects, according to an embodiment of the present disclosure.
Figure 6:
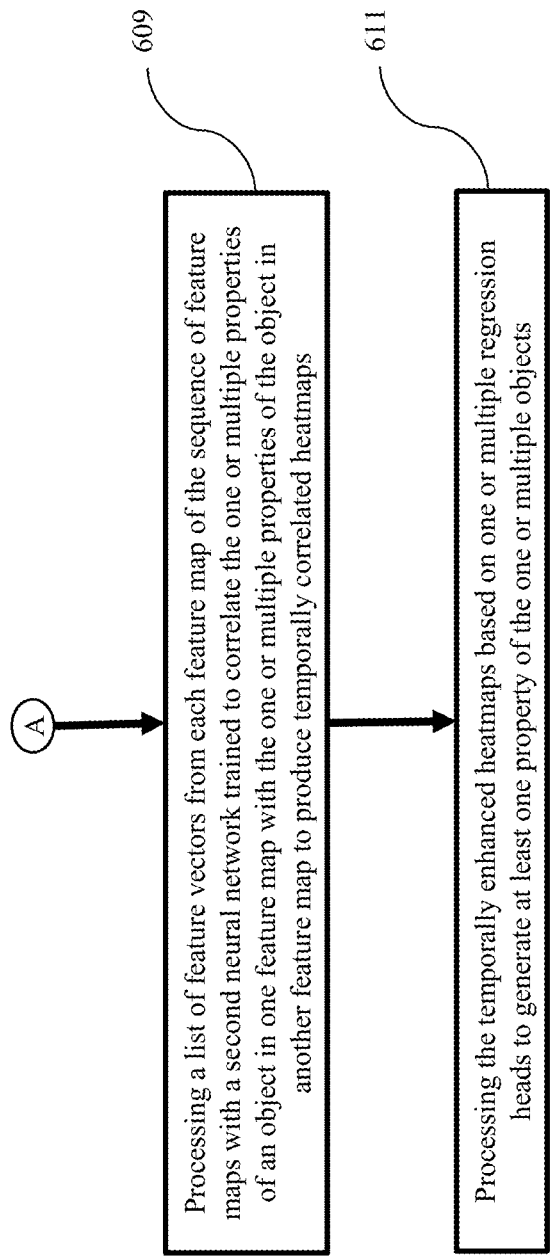

FIG. 6 shows a block diagram of a method 600 for detecting and tracking one or multiple objects, according to an embodiment of the present disclosure. At block 601, the method 600 includes collecting the sequence 107 of radar image frames indicative of radar measurements of a scene including the one or multiple objects at different consecutive instances of time. The sequence 107 of radar image frames includes the current frame 107a and at least one previous frame 107b. At block 603, the method 600 includes permuting an order of frames in the sequence 107 of radar image frames to produce multiple permuted sequences of radar image frames with different frames at a dominant position in a corresponding permuted sequence of radar image frames. For example, the first permuted sequence 201 is produced with the current frame 107a at the dominant position and the previous frame 107b at the subordinate position. Similarly, the second permuted sequence 203 is produced with the previous frame 107b at the dominant position and the current frame 107a at the subordinate position.

At block 605, the method 600 includes processing each permuted sequence of radar image frames with the first neural network 205 trained to extract features of a frame at the dominant position in a temporal correlation with features of one or multiple frames in the subordinate position to produce temporally enhanced features for each of the frames in the sequence 107 of radar image frames. At block 607, the method 600 includes reconstructing a feature map indicative of one or multiple properties of the one or multiple objects in the scene from the temporally enhanced features of each of the frames in the sequence of radar image frames to produce a sequence of feature maps, e.g., the feature maps 207 and 209, as explained in FIG. 2.

At block 609, the method 600 includes processing a list of feature vectors from each feature map of the sequence of feature maps with the second neural network 215 trained to aggregate the one or multiple properties of an object in one feature map (e.g., the feature map 207) with the one or multiple properties of the object in another feature map (e.g., the feature map 209) to produce temporally enhanced heatmaps. At block 611, the method 600 includes processing the temporally enhanced heatmaps based on one or multiple regression heads to generate at least one property of the one or multiple objects.

Figure 7:
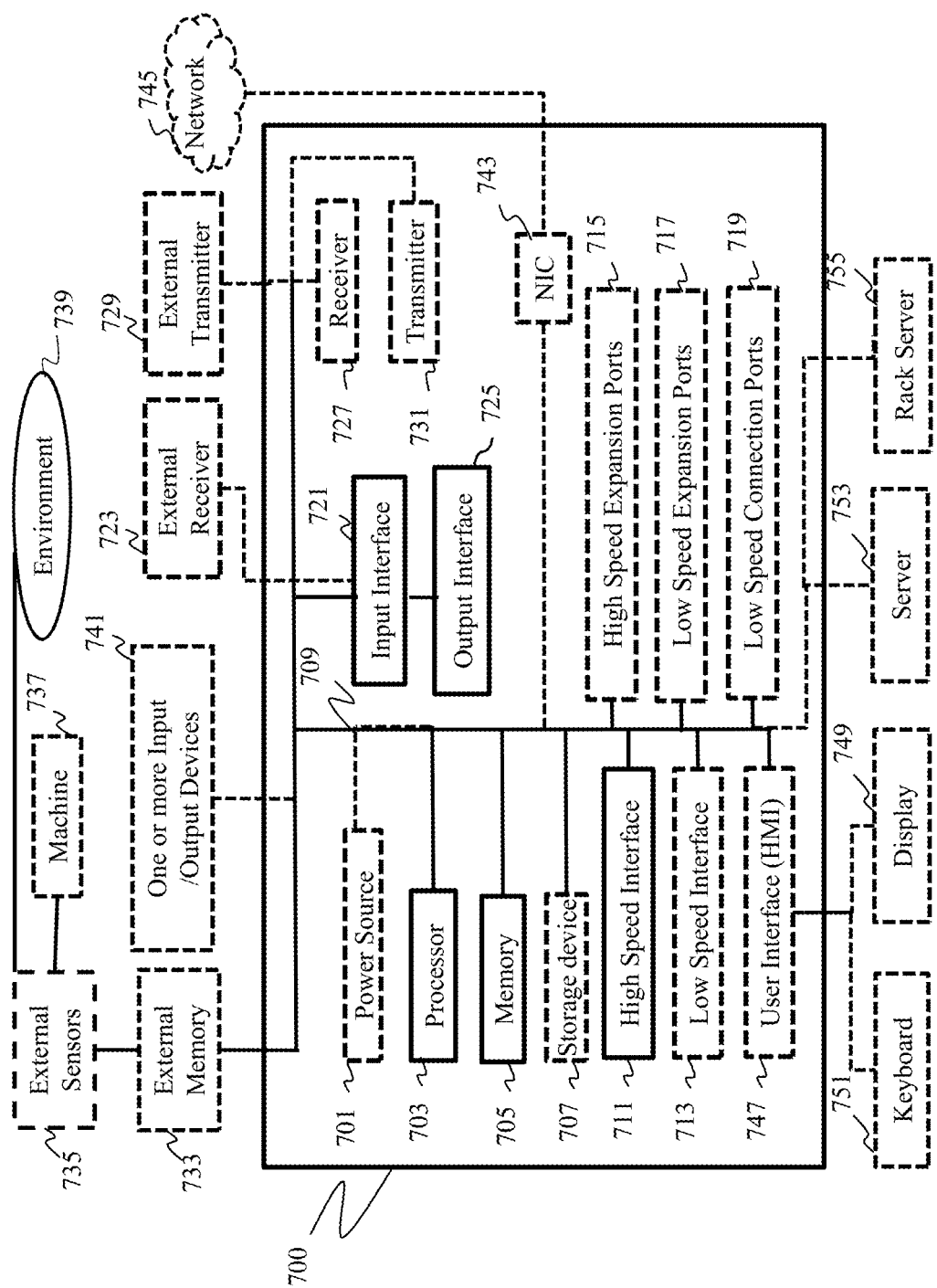
FIG. 7 is a schematic diagram illustrating a computing device that can be used for implementing systems and methods of the present disclosure.

FIG. 7 is a schematic illustrating a computing device 700 for implementing the methods and systems of the present disclosure. The computing device 700 includes a power source 701, a processor 703, a memory 705, a storage device 707, all connected to a bus 709. Further, a high-speed interface 711, a low-speed interface 713, high-speed expansion ports 715 and low speed connection ports 717, can be connected to the bus 709. In addition, a low-speed expansion port 719 is in connection with the bus 709. Further, an input interface 721 can be connected via the bus 709 to an external receiver 723 and an output interface 725. A receiver 727 can be connected to an external transmitter 729 and a transmitter 731 via the bus 709. Also connected to the bus 709 can be an external memory 733, external sensors 735, machine(s) 737, and an environment 739. Further, one or more external input/output devices 741 can be connected to the bus 709. A network interface controller (NIC) 743 can be adapted to connect through the bus 709 to a network 745, wherein data or other data, among other things, can be rendered on a third-party display device, third party imaging device, and/or third-party printing device outside of the computing device 700.

The memory 705 can store instructions that are executable by the computing device 700 and any data that can be utilized by the methods and systems of the present disclosure. The memory 705 can include random access memory (RAM), read only memory (ROM), flash memory, or any other suitable memory systems. The memory 705 can be a volatile memory unit or units, and/or a non-volatile memory unit or units. The memory 705 may also be another form of computer-readable medium, such as a magnetic or optical disk.

The storage device 707 can be adapted to store supplementary data and/or software modules used by the computer device 700. The storage device 707 can include a hard drive, an optical drive, a thumb-drive, an array of drives, or any combinations thereof. Further, the storage device 707 can contain a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, the processor 703), perform one or more methods, such as those described above.

The computing device 700 can be linked through the bus 709, optionally, to a display interface or user Interface (HMI) 747 adapted to connect the computing device 700 to a display device 749 and a keyboard 751, wherein the display device 749 can include a computer monitor, camera, television, projector, or mobile device, among others. In some implementations, the computer device 700 may include a printer interface to connect to a printing device, wherein the printing device can include a liquid inkjet printer, solid ink printer, large-scale commercial printer, thermal printer, UV printer, or dye-sublimation printer, among others.

The high-speed interface 711 manages bandwidth-intensive operations for the computing device 700, while the low-speed interface 713 manages lower bandwidth-intensive operations. Such allocation of functions is an example only. In some implementations, the high-speed interface 711 can be coupled to the memory 705, the user interface (HMI) 747, and to the keyboard 751 and the display 749 (e.g., through a graphics processor or accelerator), and to the high-speed expansion ports 715, which may accept various expansion cards via the bus 709. In an implementation, the low-speed interface 713 is coupled to the storage device 707 and the low-speed expansion ports 717, via the bus 709. The low-speed expansion ports 717, which may include various communication ports (e.g., USB, Bluetooth, Ethernet, wireless Ethernet) may be coupled to the one or more input/output devices 741. The computing device 700 may be connected to a server 753 and a rack server 755. The computing device 700 may be implemented in several different forms. For example, the computing device 700 may be implemented as part of the rack server 755.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicate like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the present disclosure has been described with reference to certain preferred embodiments, it is to be understood that various other adaptations and modifications can be made within the spirit and scope of the present disclosure. Therefore, it is the aspect of the appended claims to cover all such variations and modifications as come within the true spirit and scope of the present disclosure.

We claim:

1. A radar system for detecting and tracking one or multiple objects, the radar system comprising: a processor; and a memory having instructions stored thereon that, when executed by the processor, cause the radar system to:
   collect a sequence of radar image frames indicative of radar measurements of a scene at different consecutive instances of time, the scene including the one or multiple objects, wherein the sequence of radar image frames includes a current frame and at least one previous frame;
   permute an order of frames in the sequence of radar image frames to produce multiple permuted sequences of radar image frames with different frames at a dominant position in a corresponding permuted sequence of radar image frames;

process each permuted sequence of radar image frames with a first neural network trained to extract features of a frame at the dominant position in a temporal correlation with features of one or multiple frames in a subordinate position to produce temporally enhanced features for each of the frames in the sequence of radar image frames;

reconstruct a feature map indicative of one or multiple properties of the one or multiple objects in the scene from the temporally enhanced features of each of the frames in the sequence of radar image frames to produce a sequence of feature maps;

process a list of feature vectors from each feature map of the sequence of feature maps with a second neural network trained to aggregate the one or multiple properties of an object in one feature map with the one or multiple properties of the object in another feature map to produce temporally enhanced heatmaps, wherein each feature vector is supplemented with a position encoding; and process the temporally enhanced heatmaps, based on one or multiple regression heads, to generate at least one property of the one or multiple objects.

2. The radar system of claim 1, wherein the processor is further configured to reconstruct a radar image of the scene using a weighted combination of the temporally enhanced heatmaps corresponding to the permuted sequence of the radar image frames with different frames at the dominant position.

3. The radar system of claim 2, wherein the weighted combination is determined analytically or learned using a neural network trained to accept input data indicative of the temporally enhanced heatmaps and output the radar image.

4. The radar system of claim 1, wherein the first neural network is a deep convolutional neural network with skip connections for multi-scale feature extraction and ensemble, and wherein the deep convolutional neural network is configured to accept multiple frames stacked in a tensor to form a multi-channel radar image and trained using a loss function, wherein the loss function is configured for minimizing errors of an output of the deep convolutional neural network with ground truth information of a frame in the dominant position.

5. The radar system of claim 1, wherein the second neural network uses an attention mechanism to place properties of corresponding objects from different feature maps in the context of each other.

6. The radar system of claim 1, wherein the processor is further configured to:
select feature vectors with top-k activations on the feature maps;
supplement the selected feature vectors with corresponding positional encodings; and
process the selected feature vectors supplemented with the corresponding positional encodings, with the second neural network.

7. The radar system of claim 1, wherein the processor is further configured to determine heatmaps of the scene based on a module $$\mathcal{G}_\theta^{hm}: \mathbb{R}^{C \times \frac{H}{s} \times \frac{W}{s}} \to \mathbb{R}^{1 \times \frac{H}{s} \times \frac{W}{s}}$$

and a sigmoid function with the temporally enhanced feature maps as inputs.

8. The radar system of claim 1, wherein one or more of the first neural network and the second neural network are trained based on end-to-end multi-branch training with each branch designed for different permuted sequences of radar image frames.

9. A method for detecting and tracking one or multiple objects, the method comprising:
collecting a sequence of radar image frames indicative of radar measurements of a scene at different consecutive instances of time, the scene including the one or multiple objects, wherein the sequence of radar image frames includes a current frame and at least one previous frame;
permuting an order of frames in the sequence of radar image frames to produce multiple permuted sequences of radar image frames with different frames at a dominant position in a corresponding permuted sequence of radar image frames;
processing each permuted sequence of radar image frames with a first neural network trained to extract features of a frame at the dominant position in a temporal correlation with features of one or multiple frames in a subordinate position to produce temporally enhanced features for each of the frames in the sequence of radar image frames;
reconstructing a feature map indicative of one or multiple properties of the one or multiple objects in the scene from the temporally enhanced features of each of the frames in the sequence of radar image frames to produce a sequence of feature maps;
processing a list of feature vectors from each feature map of the sequence of feature maps with a second neural network trained to aggregate the one or multiple properties of an object in one feature map with the one or multiple properties of the object in another feature map to produce temporally enhanced heatmaps, wherein each feature vector is supplemented with a position encoding; and
processing the temporally enhanced heatmaps, based on one or multiple regression heads, to generate at least one property of the one or multiple objects.

10. The method of claim 9, wherein the method further comprises reconstructing a radar image of the scene using a weighted combination of the temporally enhanced heatmaps corresponding to the permuted sequence of the radar image frames with different frames at the dominant position.

11. The method of claim 9, wherein the weighted combination is determined analytically or learned using a neural network trained to accept input data indicative of the temporally enhanced heatmaps and output the radar image.

12. The method of claim 9, wherein the first neural network is a deep convolutional neural network with skip connections for multi-scale feature extraction and ensemble, and wherein the deep convolutional neural network is configured to accept multiple frames stacked in a tensor to form a multi-channel radar image and trained using a loss function minimizing errors of an output of the deep convolutional neural network with ground truth information of a frame in the dominant position.

13. The method of claim 9, wherein the second neural network uses an attention mechanism to place properties of corresponding objects from different feature maps in the context of each other.

14. The method of claim 9, wherein the method further comprises:
- selecting feature vectors with top-k activations on the feature maps;
- supplementing the selected feature vectors with corresponding positional encodings; and
- processing the selected feature vectors supplemented with the corresponding positional encodings, with the second neural network.

15. The method of claim 9, wherein one or more of the first neural network and the second neural network are trained based on end-to-end multi-branch training with each branch designed for different permuted sequences of radar image frames.

16. A non-transitory computer-readable storage medium embodied thereon a program executable by a processor for performing a method for detecting and tracking one or multiple objects, the method comprising:
- collecting a sequence of radar image frames indicative of radar measurements of a scene at different consecutive instances of time, the scene including the one or multiple objects, wherein the sequence of radar image frames includes a current frame and at least one previous frame;
- permuting an order of frames in the sequence of radar image frames to produce multiple permuted sequences of radar image frames with different frames at a dominant position in a corresponding permuted sequence of radar image frames;
- processing each permuted sequence of radar image frames with a first neural network trained to extract features of a frame at the dominant position in a temporal correlation with features of one or multiple frames in a subordinate position to produce temporally enhanced features for each of the frames in the sequence of radar image frames;
- reconstructing a feature map indicative of one or multiple properties of the one or multiple objects in the scene from the temporally enhanced features of each of the frames in the sequence of radar image frames to produce a sequence of feature maps;
- processing a list of feature vectors from each feature map of the sequence of feature maps with a second neural network trained to aggregate the one or multiple properties of an object in one feature map with the one or multiple properties of the object in another feature map to produce temporally enhanced heatmaps, wherein each feature vector is supplemented with a position encoding; and
- processing the temporally enhanced heatmaps, based on one or multiple regression heads, to generate at least one property of the one or multiple objects.

17. The non-transitory computer-readable storage medium of claim 16, wherein the method further comprises reconstructing a radar image of the scene using a weighted combination of the temporally enhanced heatmaps corresponding to the permuted sequence of the radar image frames with different frames at the dominant position.

18. The non-transitory computer-readable storage medium of claim 16, wherein the first neural network is a deep convolutional neural network with skip connections for multi-scale feature extraction and ensemble, and wherein the deep convolutional neural network is configured to accept multiple frames stacked in a tensor to form a multi-channel radar image and trained using a loss function minimizing errors of an output of the deep convolutional neural network with ground truth information of a frame in the dominant position.

19. The non-transitory computer-readable storage medium of claim 16, wherein the second neural network uses an attention mechanism to place properties of corresponding objects from different feature maps in the context of each other.

20. The non-transitory computer-readable storage medium of claim 16, wherein the method further comprises:
- selecting feature vectors with top-k activations on the feature maps;
- supplementing the selected feature vectors with corresponding positional encodings; and
- processing the selected feature vectors supplemented with the corresponding positional encodings, with the second neural network.

* * * * *